W. F. PENROD.
TRANSMISSION GEAR FOR AUTOMOBILES.
APPLICATION FILED JULY 3, 1919.

1,384,481.

Patented July 12, 1921.

Inventor:
William Franklin Penrod
By Walter A. Knight
Attorney.

W. F. PENROD.
TRANSMISSION GEAR FOR AUTOMOBILES.
APPLICATION FILED JULY 3, 1919.

1,384,481.

Patented July 12, 1921.
2 SHEETS—SHEET 2.

Inventor:
William Franklin Penrod
By Walter A. Knight.
Attorney.

UNITED STATES PATENT OFFICE.

WILLIAM FRANKLIN PENROD, OF CINCINNATI, OHIO, ASSIGNOR TO ANTHONY J. WISSEL, TRUSTEE.

TRANSMISSION-GEAR FOR AUTOMOBILES.

1,384,481.    Specification of Letters Patent.    Patented July 12, 1921.

Application filed July 3, 1919. Serial No. 308,431.

*To all whom it may concern:*

Be it known that I, WILLIAM FRANKLIN PENROD, a citizen of the United States, residing at Cincinnati, in the county of Hamilton and State of Ohio, have invented new and useful Improvements in Transmission-Gears for Automobiles, of which the following is a specification.

My invention relates to the transmission gear of automobiles and the mode of applying the driving power, with reference, more particularly, though not exclusively, to use in trucks for heavy haulage; its object being to provide more efficient and simplified mechanism for producing and varying speed, lessening the number of gears actually employed in driving, conserving wear, eliminating noise, and by a better distribution of stresses lessen the danger of breakage.

Incidentally my improvements as applied to truck construction allow a gear ratio of 7 or 7¼ to 1, as compared with the standard limit of 5 to 1 on bevel gears; and a still greater ratio on heavier trucks; and permits a working connection equalizing the thrust on the differential casing and axle while preserving ample road clearance.

Mechanism embodying my invention is shown in the accompanying drawings forming part of this specification, in which—

Figure 1:
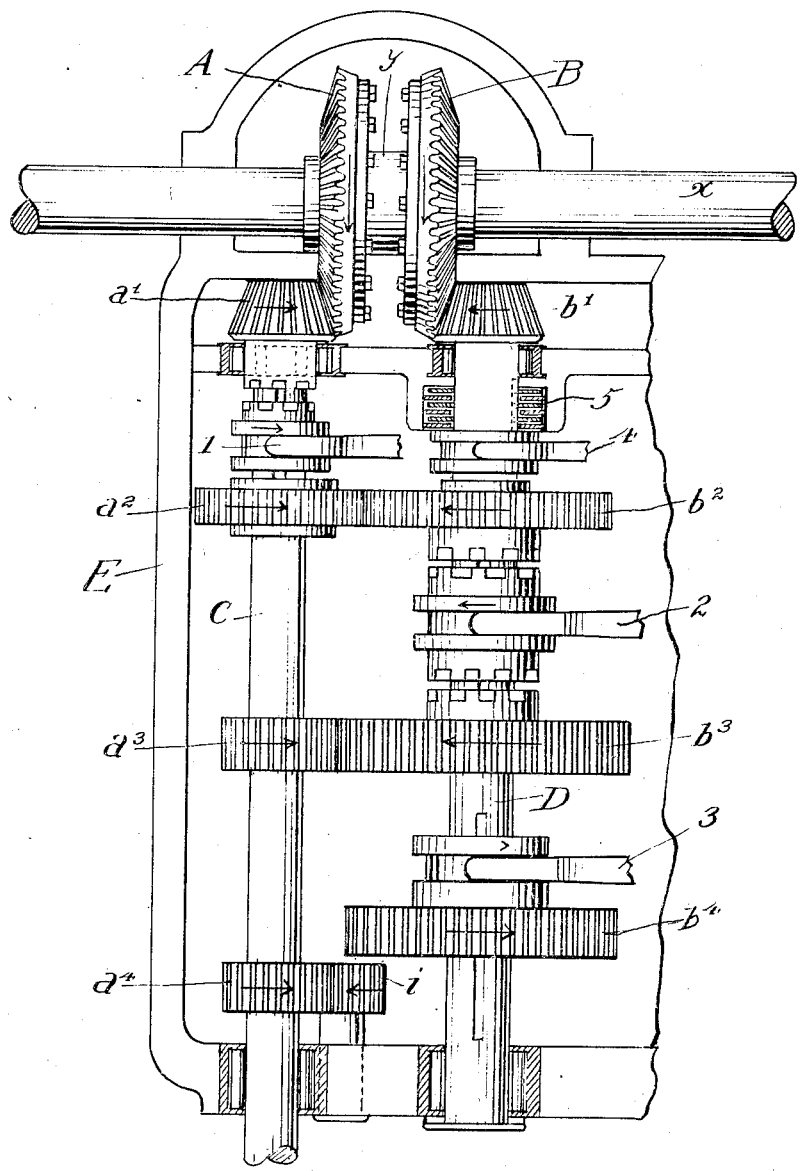
Figure 2:
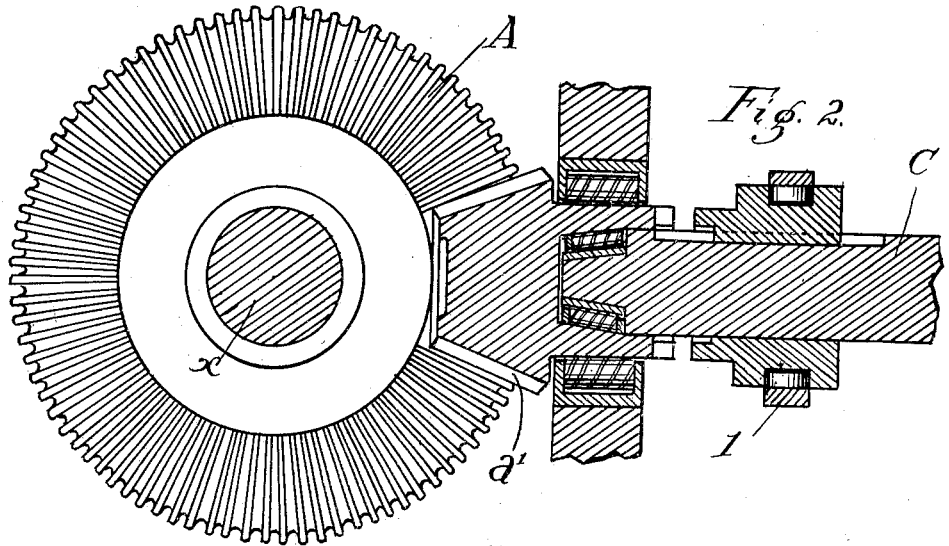
Figure 3:
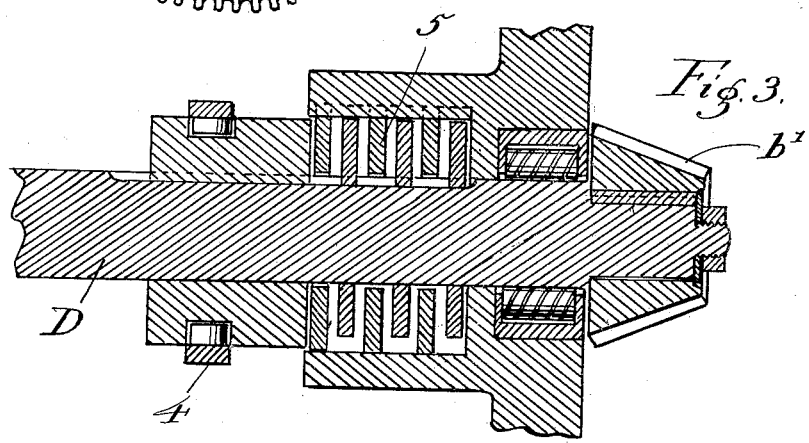
Figure 4:
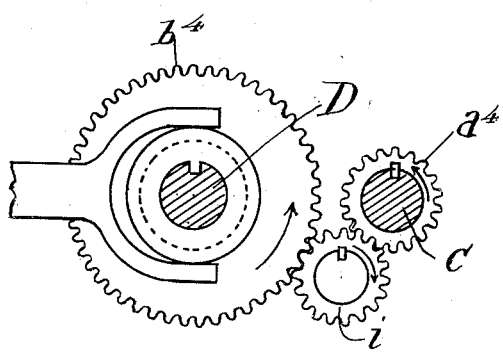

Figure 1, Sheet 1, is a general plan view of so much of the system and arrangement of gears as will exhibit my improvement, omitting the common supplementary parts used in all such mechanism;

Fig. 2, Sheet 2, an elevation of one of the ring-gear and pinion connections, of the main driving shaft with the rear axle,—horizontally sectioned through the pinion and its operating clutch;

Fig. 3, is a horizontal section through the brake mechanism and driving pinion of the countershaft—the latter being adapted to function also as a secondary driving shaft; and Fig. 4, is an elevation of the reversing gears.

X, in the drawings designates the driving axle; $y$, its differential casing; and A, B, designate respectively two bevel "ring" gears fixedly attached to the differential casing back to back and spaced apart only far enough to permit the constant driving connection with bevel pinions $a'$ $b'$ carried in corresponding relation by the main shaft C and a counter shaft D respectively, journaled in parallel relations in the plane of the axle in the gear housing E.

The main shaft C carries the terminal bevel pinion $a^1$ in constant mesh with the ring gear A, but normally loose upon its shaft C and connectible therewith for rotation by a positive clutch 1 operable by a lever (not shown). The main shaft also carries fixedly attached two or more spur gears $a^2$, $a^3$, of different diameters for transmission of power to the counter shaft D; and also a third fixed spur gear $a^4$ in constant mesh with a reducing and reversing idler $i$ carried upon a stud received in the housing E.

The counter shaft D carries a terminal pinion $b^1$ fixed upon the shaft and in constant mesh with the ring-gear B. Immediately in rear of this pinion $b^1$, I have shown a multiple disk brake 5 of the usual construction; but merely as indication of a convenient location.

Next, upon the countershaft D are shown two loose spur gears $b^2$ and $b^3$ spaced apart as opposites of fixed gears $a^2$ and $a^3$ of main shaft C with which they are in constant mesh. The gears $b^2$ $b^3$ are severally connectible with shaft D by a sliding clutch 2 in opposite movements from a central neutral position and vary speed according to the gear ratio in each case. The gears $b^2$, $b^3$ may of course be moved into and out of gear by a sliding connection but I prefer the arrangement shown. Next is a spur gear $b^4$ splined on the shaft D and provided at one side with a grooved hub for shifting by clutch yoke 3. The gear $b^4$ stands normally out of line and disconnected from the opposite idler gear $i$ but may be shifted into line and engage the idler $i$ to give a reversed motion at low speed.

The *modus operandi* is as follows:

(1.) The main drive is direct from the main shaft C through pinion $a^1$ connected with the shaft C by clutch 1 and ring gear A;

(2.) A modified speed is produced by disconnecting pinion $a^1$ by clutch 1, and connecting gear $b^2$ to its shaft D by clutch 2. The drive is then through gears $a^2$, $b^2$, pinion $b^1$ and ring gear B.

(3.) A third drive is had by disconnecting pinion $a^1$, and connecting gear $b^3$ by the clutch 2. The drive is then through gears $a^3$, $b^3$ and pinion $b'$ of shaft D and ring gear B.

By the system herein disclosed, as will be readily seen, any number of speeds may be provided for, limited only by space; and that every variation in speed involves the same simplicity of attainment and transmission through but four of the usual six gears employed in standard construction. It will be obvious that chain gears may be substituted for the spur gear connections between the two shafts, and that a single ring-gear with teeth at both sides may be substituted in place of two separate gears.

I claim as my invention, and desire to secure by Letters Patent of the United States:—

1. In a transmission gear system for automobiles, the combination with the axle, differential gearing and its rotating casing; of two equal outer-driven bevel-gears fixedly seated in close contiguity upon the differential casing back to back; a primary driving shaft connectible direct with the motor and provided with a plurality of transmission gears fixed to the shaft, and an auxiliary driving shaft in parallel connectible with the primary driving shaft for receiving power and a plurality of loose gears normally loose upon the auxiliary shaft in mesh severally with the corresponding driving gears, and connectible severally with the auxiliary shaft; and two equal terminal bevel pinions one upon the forward end of each shaft—that upon the primary driving-shaft being normally loose and attachable thereto by a sliding clutch, and the other being permanently attached to the counter shaft; each of said pinions being in constant mesh with its contiguous ultimate driven gear upon the differential casing.

2. In a transmission-gear driving system a main shaft and a countershaft in parallel, each having a terminal bevel pinion; a plurality of spur gears of varying diameter fixedly carried on said main shaft; a corresponding plurality of spur gears carried loosely on said countershaft in constant mesh each with its opposite gear of the main shaft; clutches for connecting either of said loose gears with the countershaft and for connecting or disconnecting the terminal pinion of the mainshaft with or from its shaft; a stud independently fixed to the frame; a loose reversing gear thereon in constant mesh with one of the fixed gears; and a sliding clutch gear splined on the countershaft adapted to be moved laterally into mesh with the reversing gear.

3. In a transmission gear of the character indicated, in combination with the ultimately driven axle and its differential mechanism and casing, two beveled ring-gears, duplicates, permanently secured upon the differential casing in contiguity back to back; a continuous primary and a continuous auxiliary shaft, duplicates, extending forward of the ring gears in parallel, duplicate rear-terminal bevel pinions in permanent mesh with the ring-gears, the pinion of the primary shaft normally free, a splined clutch operating to connect said pinion in rotation with its shaft as desired; and a plurality of transmission spur gears permanently secured upon the primary shaft in constant mesh with corresponding free gears upon the auxiliary shaft, and sliding clutches to connect said free gears each in turn with its opposite upon the primary shaft.

In testimony whereof I have hereunto set my hand in presence of two subscribing witnesses.

WILLIAM FRANKLIN PENROD.

Witnesses:
 MABEL E. HARPER,
 NORMA D. BERGER.